(No Model.)

C. M. WOOD.
ANIMAL TIE.

No. 599,579. Patented Feb. 22, 1898.

Witnesses,
W. F. Doyle
Fred R. Proctor

Inventor
Charles M. Wood.
By Knight Bros
Attorneys,

UNITED STATES PATENT OFFICE.

CHARLES M. WOOD, OF KNOXVILLE, PENNSYLVANIA, ASSIGNOR OF ONE-HALF TO JEROME W. HATHAWAY, OF ELMIRA, NEW YORK.

ANIMAL-TIE.

SPECIFICATION forming part of Letters Patent No. 599,579, dated February 22, 1898.

Application filed January 29, 1897. Serial No. 621,235. (No model.)

*To all whom it may concern:*

Be it known that I, CHARLES M. WOOD, a citizen of the United States, and a resident of Knoxville, in the county of Tioga and State of Pennsylvania, have invented certain new and useful Improvements in Animal-Ties, of which the following is a specification.

The object of my invention is to provide an animal-tie that will give the animal when tied to it perfect freedom in all its movements; and it consists, essentially, of suitable base and top pieces and rounded uprights or standards supporting and connecting them, on which rigid throat-pieces having straps secured thereto work.

My invention consists in novel features of construction, as hereinafter described and claimed.

In order that my invention may be fully understood, I will proceed to describe the same with reference to the accompanying drawings, in which—

Figure 1:
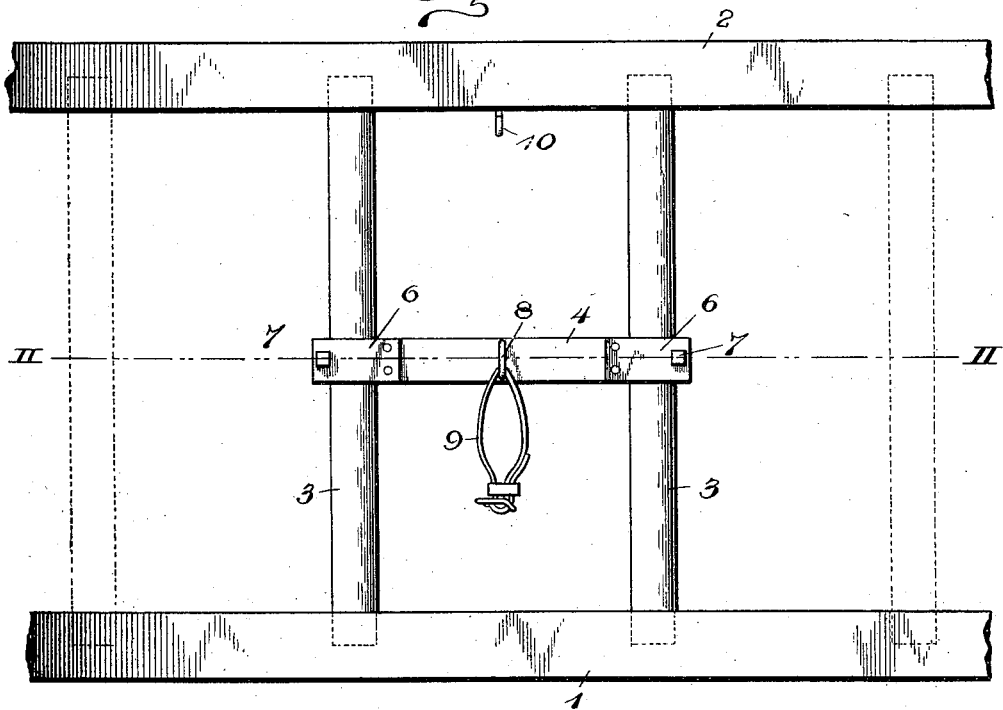
Figure 2:
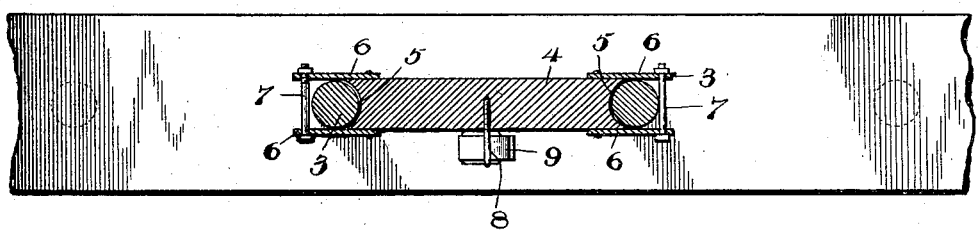

Figure 1 is an elevation of my improved animal-tie; Fig. 2, a horizontal section thereof taken on the line II II, Fig. 1.

1 represents a base-piece, which may be of any material, size, or length.

2 is a top piece, and 3 uprights or standards which connect the top and bottom pieces. These uprights or standards may be of any material or length desired, and they are preferably round in cross-section.

4 represents a rigid throat-piece of any suitable material, and it is formed at its ends with semicircular cut-out portions 5, and has secured to its sides at each end a pair of metal pieces 6, which embrace the uprights or standards and are connected at their free ends by bolts 7. This is my preferred construction of throat-piece, as it can be easily and conveniently removed by taking out the bolts 7; but it will be understood that I do not limit myself to this construction, as the throat-piece may be formed of a single piece and have openings formed in the ends thereof, through which the uprights or standards 3 may pass. If the latter form of throat-piece is used, it is placed on the standards before the top piece is placed on them.

8 represents an eye or ring secured to the throat-piece in any manner desired, and 9 represents a neck-strap secured thereto by which an animal is tied.

10 represents a hook secured to the top piece, on which the neck-strap is supported when it is desired to prevent the throat-piece falling to the floor and in position to hitch the animal.

The operation of my device will be readily understood from the above description and drawings, all that is necessary being to securely fasten one end of the neck-strap to the hook, leaving the other end of the neck-strap connected to the eye or ring. When the animal approaches the stall and places its head over the throat-piece, the upper end of the strap is disconnected and the strap brought around the animal's neck and the ends fastened together. This in itself will allow some freedom for the animal and the movable throat-piece will allow further freedom, the throat-piece being lowered or raised by the animal, according to the position the animal assumes.

The device, as stated, may be of any size and can be used in stalls, &c., and, in fact, in any place where it is desired to tie animals.

Having thus described my invention, the following is what I claim as new therein and desire to secure by Letters Patent:

1. An animal-tie comprising a pair of uprights, a rigid horizontal throat-piece having cut-out ends fitting the uprights and adapted to slide vertically thereon and over which the animal's head projects in hitching, and the vertically-extending neck-strap fastened fixedly to the throat-piece; substantially as described.

2. An animal-tie comprising a pair of round uprights, a rigid horizontal throat-piece having cut-out ends fitting the uprights and adapted to slide vertically thereon, the rigid eye or ring fixed to the throat-piece and the vertically-arranged neck-strap passed through the eye or ring; substantially as described.

3. The combination of the top and base pieces, the uprights connecting them, the horizontal throat-piece working on said uprights and formed with the cut-out portions at its ends, the metal pieces secured to the ends, the bolts connecting them, the neck-strap, and the fastening by means of which the neck-strap is secured to the middle of the throat-piece, substantially as described.

4. The combination of the top and base pieces, the hook carried by the top piece, the uprights connecting them, the horizontal throat-piece working on said uprights and formed with cut-out portions at its ends through which the uprights pass, the neck-strap adapted to be supported on the hook, and the fastening by means of which the neck-strap is secured fixedly to the middle of the throat-piece; substantially as described.

CHARLES M. WOOD.

Witnesses:
A. M. DUNHAM,
GILES ROBERTS.